United States Patent
Ma et al.

(10) Patent No.: US 8,041,133 B2
(45) Date of Patent: Oct. 18, 2011

(54) METHOD AND SYSTEM FOR PROGRESSIVE IMAGE TRANSMISSION

(75) Inventors: Wei-Ying Ma, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/563,994

(22) Filed: Sep. 21, 2009

(65) Prior Publication Data
US 2010/0073372 A1 Mar. 25, 2010

Related U.S. Application Data

(63) Continuation of application No. 10/957,316, filed on Oct. 1, 2004, now Pat. No. 7,609,898.

(51) Int. Cl.
*G06K 9/36* (2006.01)

(52) U.S. Cl. ........................ 382/233; 382/240

(58) Field of Classification Search ........... 382/232–253
See application file for complete search history.

(56) References Cited

U.S. PATENT DOCUMENTS

| 7,130,474 B2 | 10/2006 | Luo et al. |
| 2004/0088726 A1 | 5/2004 | Ma et al. |
| 2004/0165784 A1 | 8/2004 | Xie et al. |
| 2005/0141774 A1* | 6/2005 | Deever .......................... 382/240 |
| 2006/0072833 A1 | 4/2006 | Ma et al. |

OTHER PUBLICATIONS

Bradley, A.P., Stentiford, F.W.M., "Visual Attention for Region of Interest Coding in JPEG2000," *Journal of Vision Communications & Image Representation*, 14(2003) 232-250.
Chen, L.Q., Xie, X., et al, "A visual attention model for adapting images on small displays," *ACM Multimedia Systems Journal*, vol. 9, No. 4, pp. 353-364, 2003.
Chen, Liqun et al., "A Visual Attention Model for Adapting Images on Small Displays," Technical Report, Nov. 4, 2002 (21 pages).
Chitprasert, B., Rao, K.R, "Human Visual Weighted Progressive Image Transmission", *IEEE Trans. on Communications*, vol. 38, No. 7, pp. 1040-1044, Jul. 1990.
Christopoulos et al., "The JPEG2000 Still Image Coding System: An Overview," IEEE Transactions on Consumer Electronics, vol. 46, No. 4, Nobember 2000.
Christopoulos, C., Askelf, J., et al., "Efficient Methods for encoding Regions of Interest in the upcoming JPEG2000 still image coding standard", *IEEE Signal Processing Letters*, vol. 7, pp. 247-249, Sep. 2000.
Fox et al., "Adapting to Network and Client Variability via On-Demand Dynamic Distillation," Proceedings of the 7th International Conference on Architectural Support for Programming Languages and Operating Systems, Oct. 1996.

(Continued)

*Primary Examiner* — Shavesh Mehta
*Assistant Examiner* — Sean Motsinger
(74) *Attorney, Agent, or Firm* — Perkins Coie LLP (57) ABSTRACT

A method and system for transmitting an image progressively is provided. The transmission system identifies a first region and a second region of the image. The transmission system also identifies a first resolution and a second resolution. The transmission system then transmits the image by transmitting, in the following order, the first region in the first resolution, the second region in the first resolution, the first region in the second resolution, and the second region in the second resolution. The transmission system may identify the regions based on the likelihood of being the focus of user attention.

18 Claims, 7 Drawing Sheets

OTHER PUBLICATIONS

Hu et al., Dept. of Autom., Univ. of Sci. & Technol. Of China; This paper appears in: Multimedia and Expo, 2004. ICME '04, 2004 IEEE International Conference on Publication Date: 30-30 Jun. 2004, vol. 2, pp. 1079-1082.

ISO/IEC JTC 1/SC 29/WG 1 (ITU-T SG8) JPEG2000 Part I Final Committee Draft Version 1.0, Mar. 2000.

JJ2000 Site: http://jj2000.epfl.ch/.

Liu, L., Fan, G., "A new JPEG2000 region-of-interest image coding method: partial significant bitplanes shift", *IEEE Signal Processing Letters*, vol. 10, No. 2, pp. 35-38, Feb. 2003.

Ma, Y.F., Lu, L., et al, "An Attention Model for Video Summarization", *ACM Multimedia*, 2002.

Ma, Y.F., Zhang, H.J, "Contrast-based Image Attention Analysis by Using Fuzzy Growing", *ACM Multimedia*, 2003.

Osberger, W., Maeder, a.J., "Automatic Identification of Perceptually Important Regions in an Image", *Proceedings ICPR 1998*, vol. 1, 16-20, pp. 701-704, Aug. 1998.

Privitera, C.M., Stark, L.W., "Algorithms for Defining Visual Regions-of-Interest: Comparison with Eye Fixations", *IEEE Tran. PAMI*, vol. 22, No. 9, Sep. 2000.

Said, A., Pearlman, W.A., "A New, Fast, and Efficient Image Codec Based on Set Parttitioning in Hierarchical Trees", *IEEE Trans. On Circuits and Systems for Video Technology*, vol. 6. No. 3, pp. 243-250, Jun. 1996.

Wang, Z., Bovik, A. C., "Bitplane-by-Bitplane Shift (BbBShift)—A Suggestion for JPEG 2000 Region of Interest Coding", *IEEE Signal Processing Letters*, vol. 9, No. 5, pp. 160-162, May 2002.

\* cited by examiner

METHOD AND SYSTEM FOR PROGRESSIVE IMAGE TRANSMISSION

CROSS REFERENCE TO RELATED APPLICATION

This application is a continuation application of U.S. patent application Ser. No. 10/957,316, filed on Oct. 1, 2004, and entitled "METHOD AND SYSTEM FOR PROGRESSIVE IMAGE TRANSMISSION," which is incorporated herein in its entirety by reference.

TECHNICAL FIELD

The described technology relates generally to image transmission and particularly to progressive image transmission.

BACKGROUND

It can take a considerable amount of time to download and display an image using a low-speed connection such as a telephone line or a cellular phone connection. For example, it can take 60 seconds to transmit an 800-by-600 pixel image with 24 bits per pixel over a standard telephone line. This transmission time presents problems because users typically expect an image to be transmitted and displayed within 10 seconds. If the image is not displayed within that time, then users may become dissatisfied with the delay and even abort the transmission.

Progressive image transmission ("PIT") techniques have been used to help overcome this long delay before a user can view an image. PIT techniques start by transmitting the image in low resolution followed by increasingly higher resolutions. Since the image in low resolution can be transmitted much faster than in high resolution, the image can be displayed to the user more quickly, albeit in a lower resolution. A user can abort transmission of the image in high resolution based on viewing the image in low resolution because it may be not of interest, rather than having to wait until the image in high resolution is displayed.

With such progressive image transmission techniques, however, users still need to wait until the entire image in low resolution is transmitted and displayed before a decision can be made as to whether the image is of interest. Some progressive image transmission techniques attempt to identify important areas of an image and transmit those important areas before transmitting less important areas. Such techniques typically use a minimal distortion principle to identify areas of high distortion and transmit those areas first. Relying on the minimal distortion principle, however, does not necessarily provide the best viewing experience when an image is transmitted progressively. The importance based on the minimal distortion principle does not correspond very well to what people perceive as important. In addition, since people perceive only part of an image to be important, the minimal distortion principle may be applied to unimportant parts.

It would be desirable to have a progressive image transmission technique that would automatically identify areas of an image that people would perceive as important and base progressive image transmission on that importance.

SUMMARY

A method and system for transmitting an image progressively is provided. The transmission system identifies a first region and a second region of the image. The transmission system also identifies a first resolution and a second resolution. The transmission system transmits the image by transmitting, in the following order, the first region in the first resolution, the second region in the first resolution, the first region in the second resolution, and the second region in the second resolution. The transmission system may identify the regions based on the likelihood of being the focus of user attention.

DETAILED DESCRIPTION

A method and system for transmitting an image progressively is provided. In one embodiment, the transmission system identifies a first and second region of the image. For example, the first region may correspond to an area of the image that a person would perceive as important or of interest (e.g., a face), and the second region may correspond to an area of the image that a person would perceive as less important (e.g., the background). The transmission system also identifies a first resolution and a higher second resolution. The transmission system then transmits the image by first transmitting the first region in the first resolution followed by the second region in the first resolution. The transmission system then transmits the first region in the second resolution followed by the second region in the second resolution. When the image is displayed, a user first sees the region of interest in low resolution followed by the background in low resolution. In the following, the term "background" refers to the area of the image other than the region of interest. After viewing the region of interest in low resolution, the user may have enough information to decide whether to continue with the transmission. If the user continues with the transmission, then after viewing the background in low resolution, the user may have enough information to decide whether to continue with the transmission. After viewing the region of interest in high resolution, the user can again decide whether to continue with the transmission. In this way, a user first views the region of interest in low resolution followed by the overall image in low resolution. The user can thus decide at various times, based on the areas of the image that have been displayed so far, whether to continue with the transmission.

In one embodiment, the transmission system identifies the region of interest by applying an attention model to the image. The attention model identifies objects, referred to as attention objects, within the image that users are expected to focus their attention on and that thus are important objects. For example, a user may be expected to focus their attention on a face or text within an image. The transmission system calculates an attention value for each attention object, which indicates a likelihood that a user will focus their attention on that object. The attention objects may be identified by a rectangular area or some other shaped area. In one embodiment, the transmission system may apply the attention model to an image as defined in Chen L. Q., Xie X., et al., "A Visual Attention Model for Adapting Images on Small Displays," ACM Multimedia System Journal, vol. 9, no. 4, pp. 353-364, 2003, or U.S. patent application Ser. No. 10/286,053, titled "SYSTEMS AND METHODS FOR GENERATING A COMPREHENSIVE USER ATTENTION MODEL," filed on Nov. 1, 2002, which is hereby incorporated by reference. After identifying the attention objects, the transmission system then selects those attention objects with a high attention value to compose the region of interest. The transmission system may select the attention objects to ensure that the total region of interest is not too large and the number of attention objects within the region of interest is not too great. For example, the transmission system may ensure that the total region of interest is less than a certain percentage (e.g., 25%) of the total image and that the number of attention objects within the region of interest is less than an experimentally derived number such as six. If the region of interest is too large, it may take too long to transmit even in a low resolution. If the region of interest has too many attention objects, then the user may not be able to focus effectively on the most important attention objects. The region of interest may comprise overlapping and disconnected attention objects. In one embodiment, the transmission system may use a region of interest bitmap mask to identify the region of interest.

In one embodiment, the transmission system identifies the most appropriate resolution ("MAR") for display of an image, which corresponds to the final resolution of the progressive image transmission. The most appropriate resolution of an image is related to its size and presentation context. A large image can have a most appropriate resolution that is lower than its actual resolution and may be even lower if the image is to be displayed as part of a web page. The transmission system may calculate the most appropriate resolution using the following equation:

$$MAR = \max(H - \max([(\log_2(1/K)], 0), 0) \quad (1)$$

where H is the maximum resolution and K is a zoom ratio for the display of the image. For example, if the possible resolutions are 800 (H=4), 400 (H=3), 200 (H=2), and 100 (H=1) pixels per inch and the zoom ratio is 0.5, then the most appropriate would be 400 (i.e., H=3 or 4-$\log_2 2$). In such a case, the transmission system transmits an image progressively in resolutions 100, 200, and 400. The transmission system determines the order of transmission for the region of interest and background in the various resolutions. For example, the transmission system may transmit, in the following order, the region of interest in resolutions 100 and 200, the background in resolutions 100 and 200, the region of interest in resolution 400, and the background in resolution 400. Alternatively, the transmission system may transmit, in the following order, the region of interest in resolution 100, the background in resolution 100, the region of interest in resolutions 200 and 400, and the background in resolutions 200 and 400. Alternatively, the transmission system may transmit, in the following order, the region of interest in resolution 100, the background in resolution 100, the region of interest in resolution 200, the background in resolution 200, the region of interest in resolution 400, and the background in resolution 400. In one embodiment, the transmission system transmits, in the following order, the region of interest in all resolutions lower than the most appropriate resolution, the background in all resolutions lower than the most appropriate resolution, the region of interest in the most appropriate resolution, and the background in the most appropriate resolution.

Figure 1:
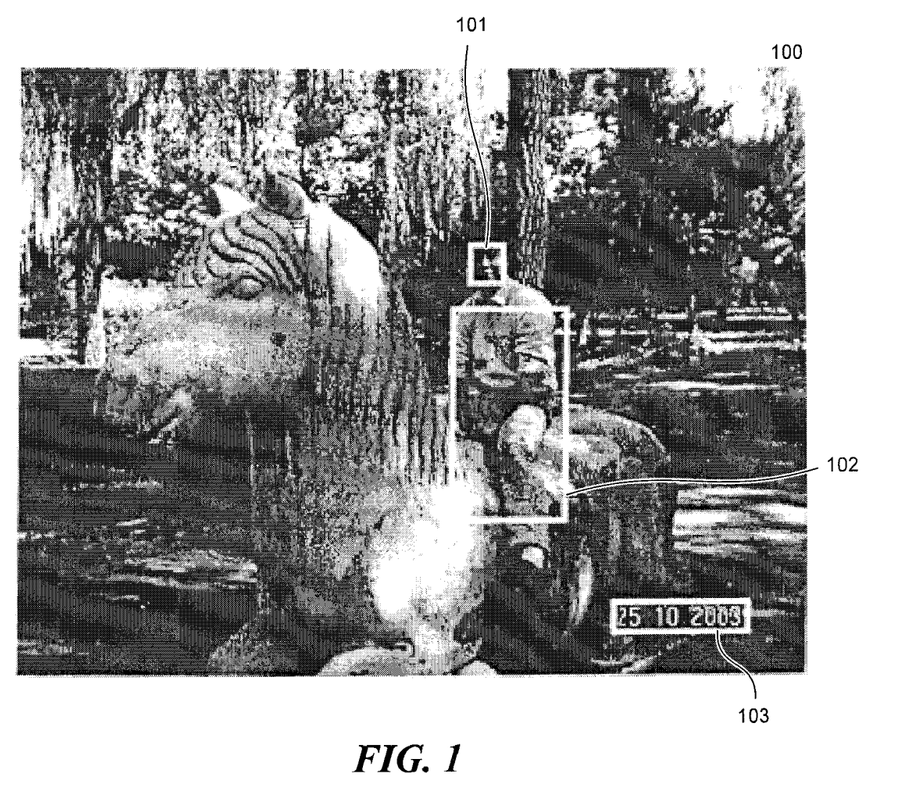
FIG. 1 illustrates an image with attention objects identified in one embodiment.

FIG. 1 illustrates an image with attention objects identified in one embodiment. An image 100 includes a person sitting on a statue of a horse with a date stamp on the image. The attention objects 101, 102, and 103 correspond to the face of the person, the body of the person, and the date stamp, respectively. These three attention objects compose the region of interest of the image. The rest of the image is considered to be background.

Figure 2:
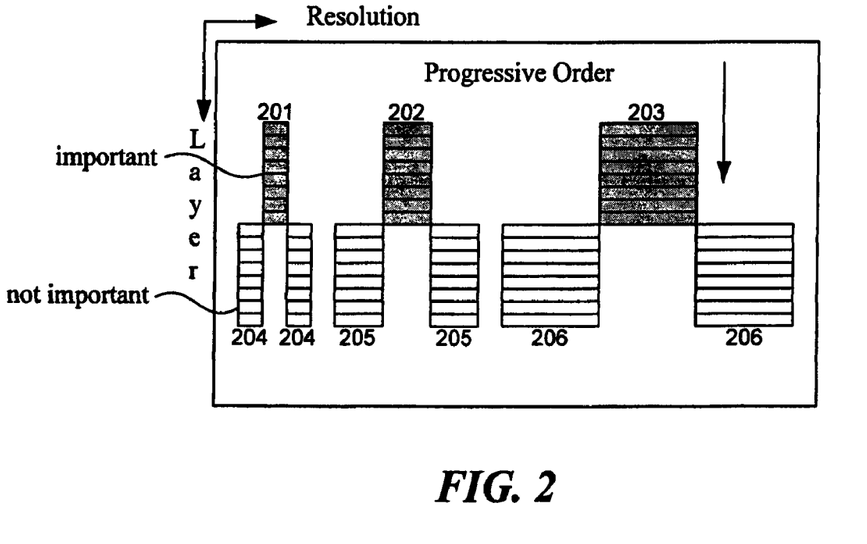
FIG. 2 illustrates a prior art progressive image transmission technique.

FIG. 2 illustrates a prior art progressive image transmission technique. In this example, the important area has been defined using a prior art technique, such as one based on minimal distortion. The prior art progressive image transmission technique transmits the important area in each of the resolutions before transmitting any of the not important area. In this example, rectangles 201, 202, and 203 correspond to the important area in resolutions 100, 200, and 400, respectively. Rectangles 204, 205, and 206 correspond to the not important area in resolutions 100, 200, and 400, respectively. The prior art progressive image transmission technique transmits the image, in the following order, important area 201 in resolution 100, important area 202 in resolution 200, important area 203 in resolution 400, not important area 204 in resolution 100, not important area 205 in resolution 200, and not important area 206 in resolution 400. A user thus views the important area in the highest resolution before viewing any of the not important area.

Figure 3:
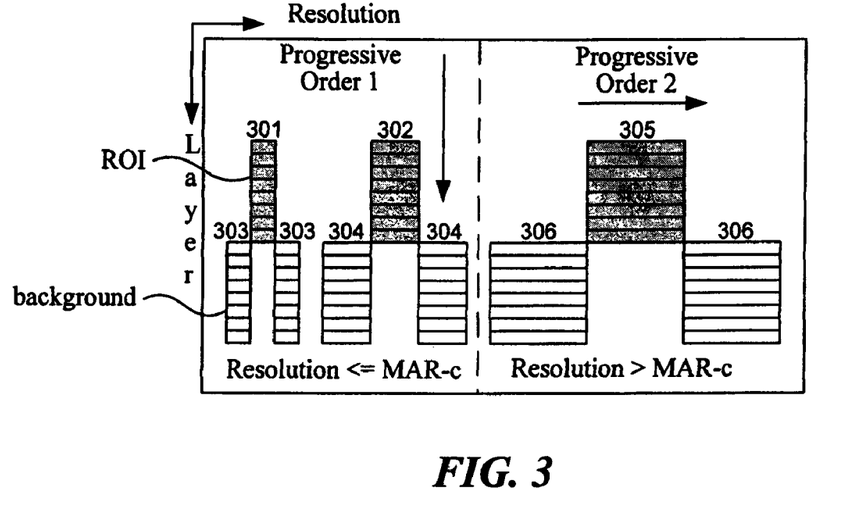
FIG. 3 illustrates the progressive image transmission technique of the transmission system in one embodiment.

FIG. 3 illustrates the progressive image transmission technique of the transmission system in one embodiment. In this example, the transmission system has identified the region of interest and background using the attention model. Rectangles 301, 302, and 305 correspond to the region of interest in resolutions 100, 200, and 400, respectively. Rectangles 303, 304, and 306 correspond to the background in resolutions 100, 200, and 400, respectively. The transmission system transmits, in the following order, the region of interest 301 in resolution 100, the region of interest 302 in resolution 200, the background 303 in resolution 100, the background 304 in resolution 200, the region of interest 305 in resolution 400, and the background 306 in resolution 400. Thus, the user views the region of interest in resolution 200 before viewing any background, and views the background in resolution 200 before viewing the region of interest in resolution 400. The transmission system may also use variations of this ordering. For example, the transmission system may transmit, in the following order, the region of interest in resolution 100, the region of interest in resolution 200, the background in resolution 100, the region of interest in resolution 400, the background in resolution 200, and the background in resolution 400. Thus, the transmission system may interleave the transmitting of the region of interest and the background in different resolutions.

Figure 4:
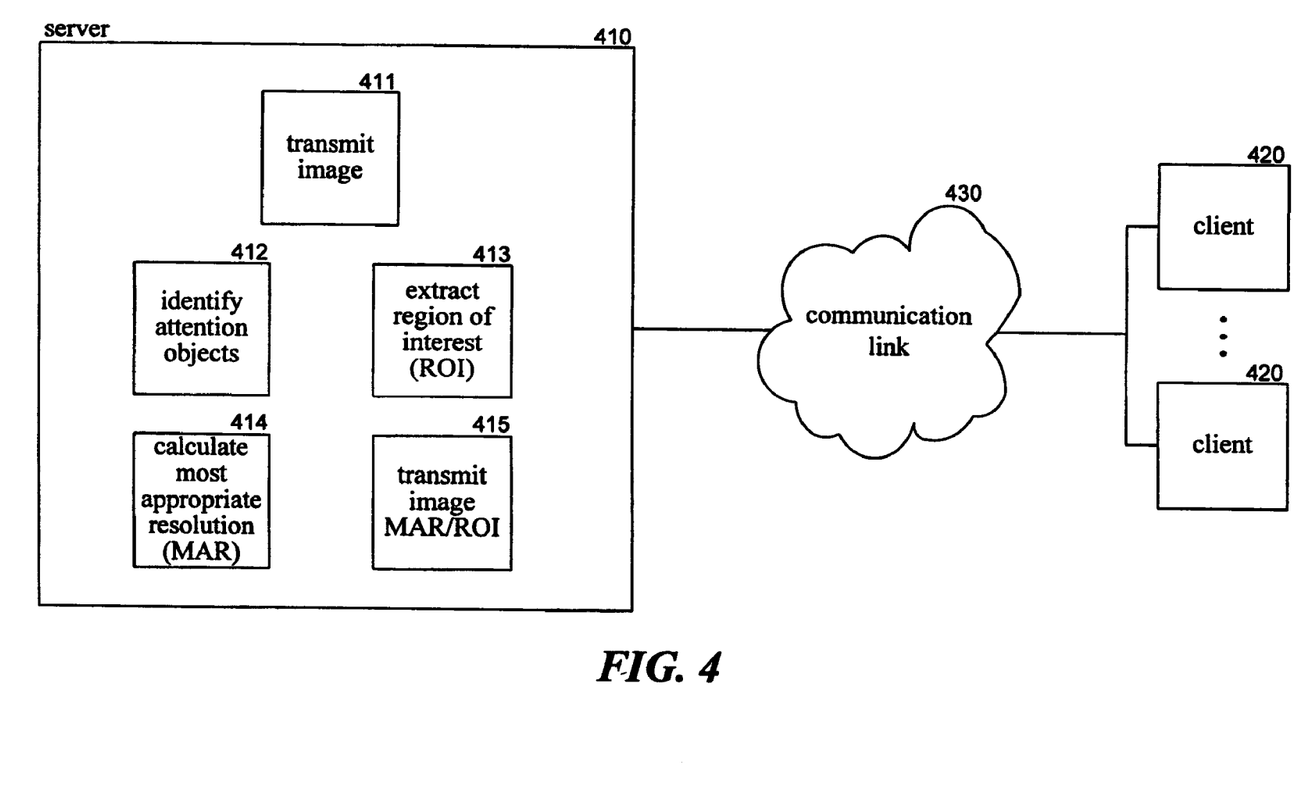
FIG. 4 is a block diagram illustrating components of the transmission system in one embodiment.

FIG. 4 is a block diagram illustrating components of the transmission system in one embodiment. The transmission system may execute on a server computer system 410 that is connected to client computer systems 420 via a communication link 430. The transmission system includes a transmit image component 411 that invokes an identify attention objects component 412, an extract region of interest component 413, a calculate most appropriate resolution component 414, and a transmit image using most appropriate resolution and region of interest component 415. The identify attention objects component processes the image to identify attention objects as rectangular areas where user attention is likely to be focused and calculates an attention value for each attention object. The extract region of interest component selects the attention objects with the highest attention values as the region of interest. The calculate most appropriate resolution component determines the appropriate final resolution for the image based on the highest possible resolution and viewing context (e.g., zoom ratio) of the image. The transmit image using most appropriate resolution and region of interest component progressively transmits the image by transmitting the background in a low resolution before transmitting the region of interest in the final resolution. The transmission system transmits images via the communication link to the client computer systems.

The computing device on which the transmission system is implemented may include a central processing unit, memory, input devices (e.g., keyboard and pointing devices), output devices (e.g., display devices), and storage devices (e.g., disk drives). The memory and storage devices are computer-readable media that may contain instructions that implement the transmission system. In addition, the data structures and message structures may be stored or transmitted via a data transmission medium, such as a signal on a communications link. Various communication links may be used, such as the Internet, a local area network, a wide area network, a point-to-point dial-up connection, cell phone network, and so on.

The transmission system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The client computer systems may be cell phones, personal digital assistants, smart phones, personal computers, programmable consumer electronics, digital cameras, and so on.

The transmission system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
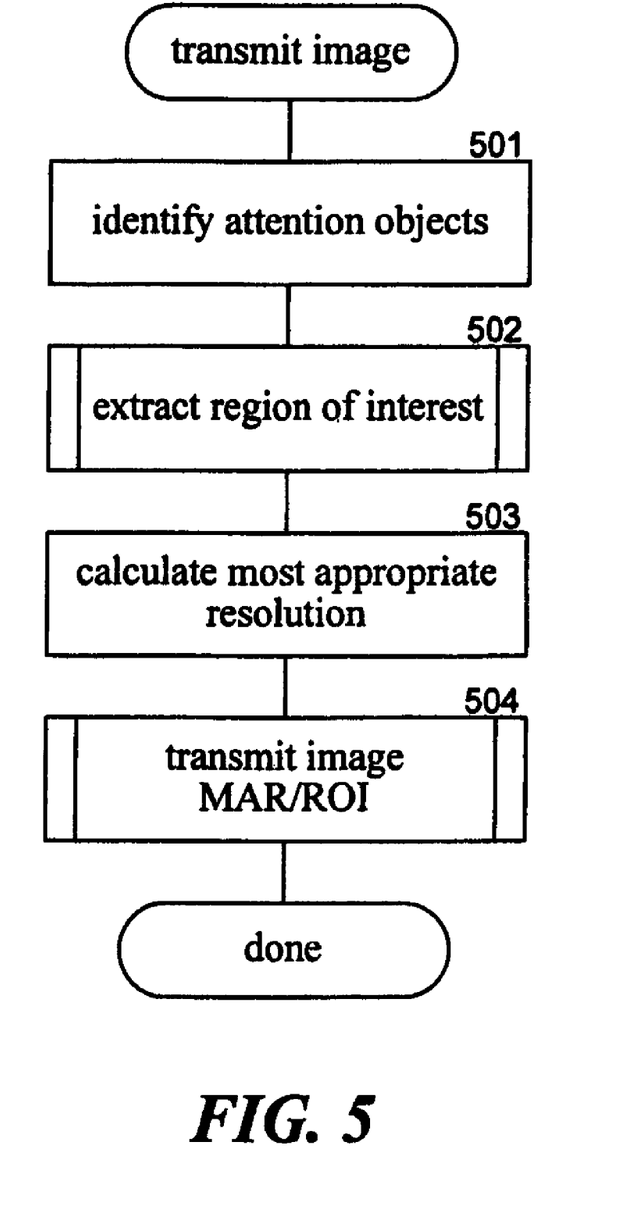
FIG. 5 is a flow diagram that illustrates the processing of the transmit image component in one embodiment.

FIG. 5 is a flow diagram that illustrates the processing of the transmit image component in one embodiment. The component is passed an image and transmits it to a client computer system. In block 501, the component invokes the identify attention objects component to identify the attention objects of the image and their attention values. In block 502, the component invokes the extract region of interest component passing the attention objects and their attention values to identify the attention objects that compose the region of interest. In block 503, the component calculates the most appropriate resolution for the image using, for example, Equation 1. In block 504, the component invokes the transmit image using most appropriate resolution and region of interest component to transmit the image from the server computer system to the client computer systems.

Figure 6:
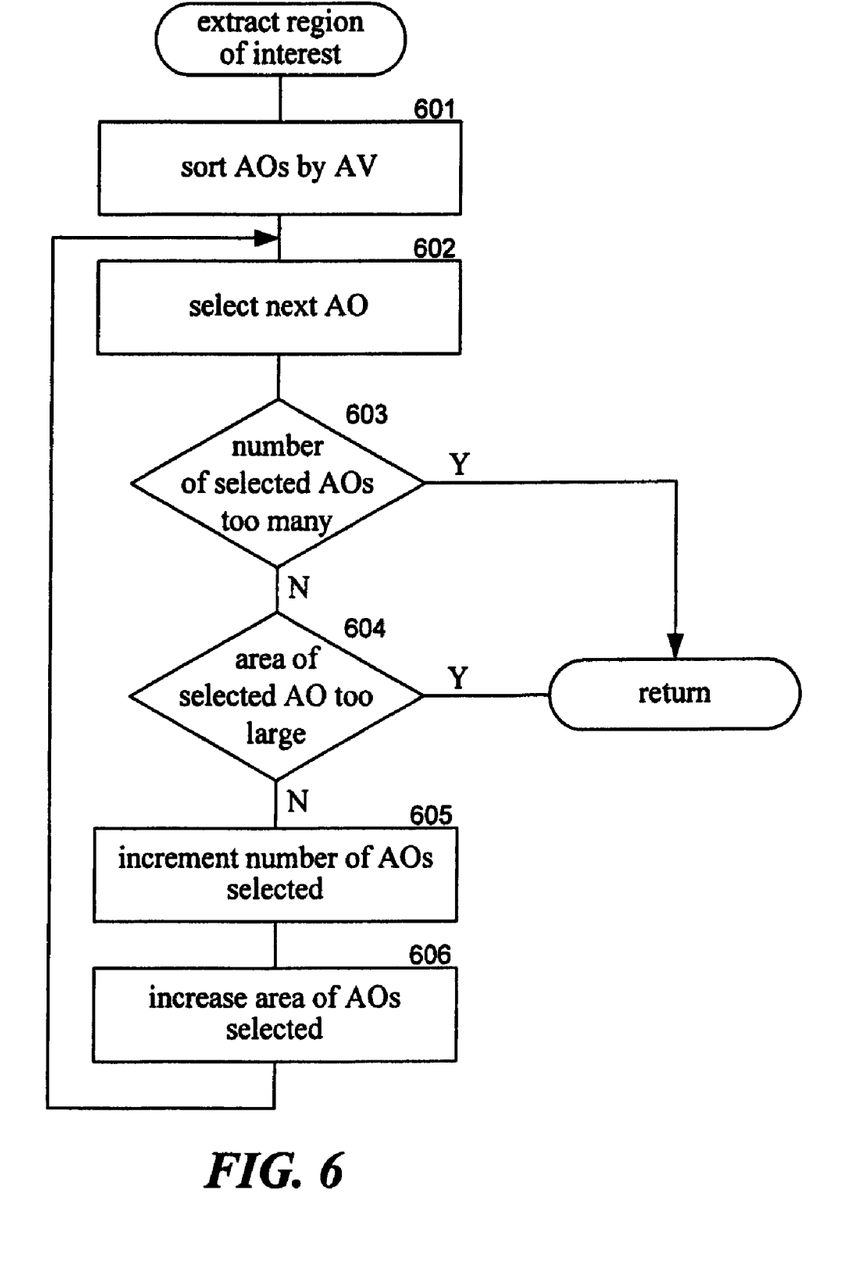
FIG. 6 is a flow diagram that illustrates the processing of the extract region of interest component in one embodiment.

FIG. 6 is a flow diagram that illustrates the processing of the extract region of interest component in one embodiment. The component sorts the attention objects by their attention values. The component then loops selecting the attention objects in attention value order until the attention objects would be too many or the region of interest would be too large. In block 601, the component sorts the attention objects by attention values. In block 602, the component selects the next attention object in attention value order. In decision block 603, if the number of attention objects that have been selected would be too great, then the component returns, else the component continues at block 604. In decision block 604, if the area of the selected attention objects would be too large for a region of interest, then the component returns, else the component continues at block 605. In block 605, the component marks the selected attention object as being part of the region of interest and increments the number of attention objects that have been selected. In block 606, the component increases the size of the region of interest by the size of the selected attention object. The component then loops to block 602 to select the next attention object. The component returns the marked attention objects as the region of interest.

Figure 7:
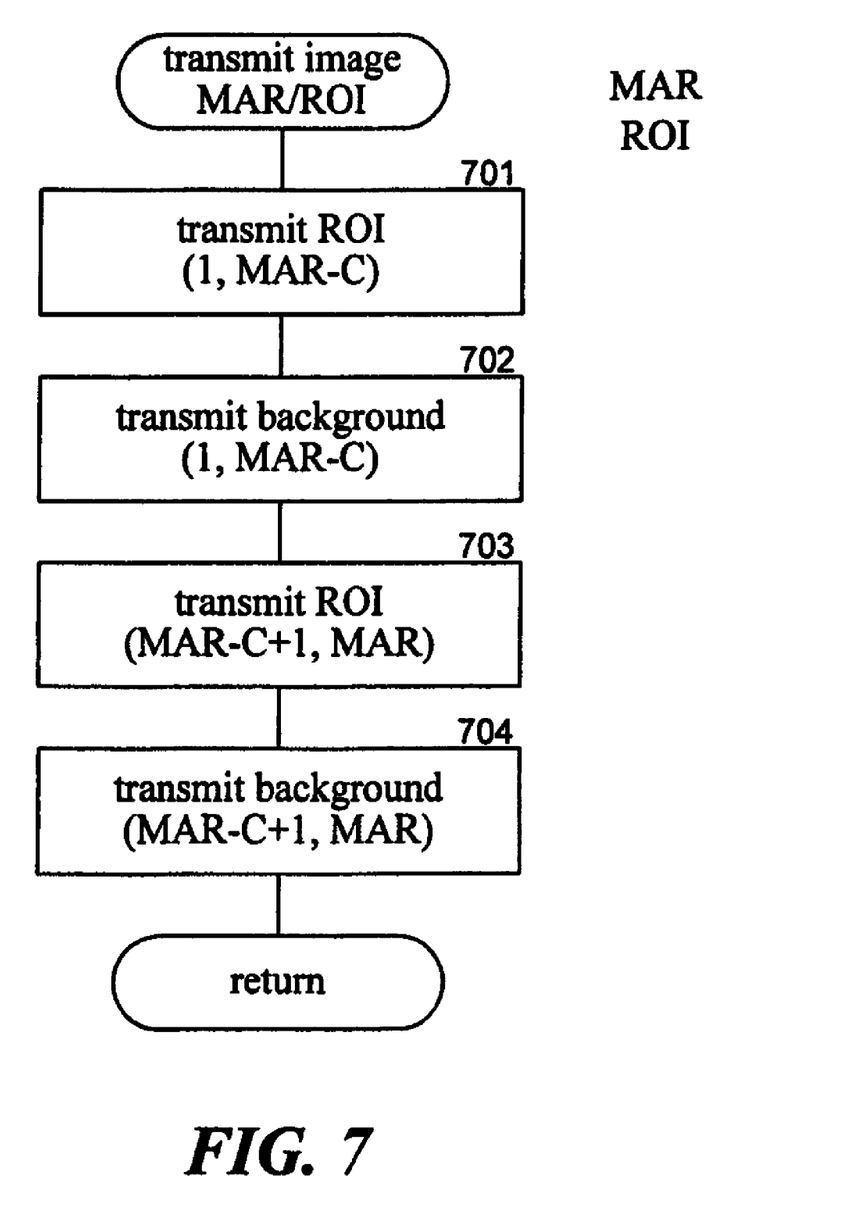
FIG. 7 is a flow diagram that illustrates the processing of the transmit image using most appropriate resolution and region of interest component in one embodiment.

FIG. 7 is a flow diagram that illustrates the processing of the transmit image using most appropriate resolution and region of interest component in one embodiment. The component is passed the most appropriate resolution and the image with the region of interest identified (e.g., using a bitmap mask). The component transmits the image in two phases in this embodiment. A phase is delimited by the region of interest and background having been transmitted in the same resolution. In phase 1, the component transmits the region of interest and the background in resolutions lower than or equal to a phase 1 resolution. In phase 2, the component transmits the region of interest and the background in resolutions greater than the phase 1 resolution. In block 701, the component invokes a transmit region of interest component passing an indication of the lowest resolution and the phase 1 resolution, which may be one or two resolutions less than the most appropriate resolution (e.g., MAR-c). In block 702, the component invokes a transmit background component passing an indication of the lowest resolution and the phase 1 resolution. In block 703, the component invokes the transmit region of interest component passing an indication of the resolution next larger than the phase 1 resolution and the most appropriate resolution. In block 704, the component invokes the transmit background component passing an indication of the resolution next larger than the phase 1 resolution and the most appropriate resolution. The component then returns. The transmission system may transmit images in more than two phases. Each phase would have a start resolution and an end resolution. The transmission system may transmit within each phase the region of interest in each resolution before the background or may interleave their transmissions in various resolutions as desired.

Figure 8:
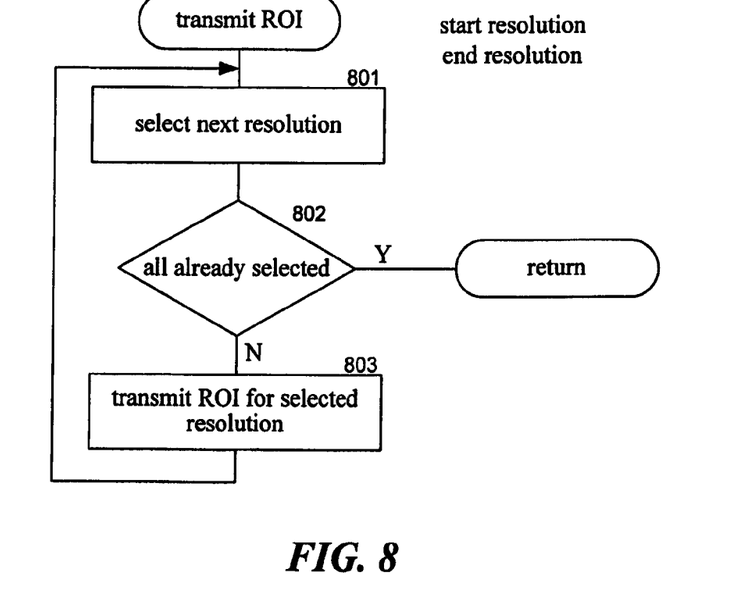
FIG. 8 is a flow diagram that illustrates the processing of the transmit region of interest component in one embodiment.

FIG. 8 is a flow diagram that illustrates the processing of the transmit region of interest component in one embodiment. The component is passed a start resolution and an end resolution. The component transmits the region of interest in each of the resolutions in the range of the start resolution to the end resolution. In block 801, the component selects the next resolution starting with the start resolution. In decision block 802, if all the resolutions have already been selected, then the component returns, else the component continues at block 803. In block 803, the component transmits the region of interest in the selected resolution and loops to block 801 to select the next resolution.

Figure 9:
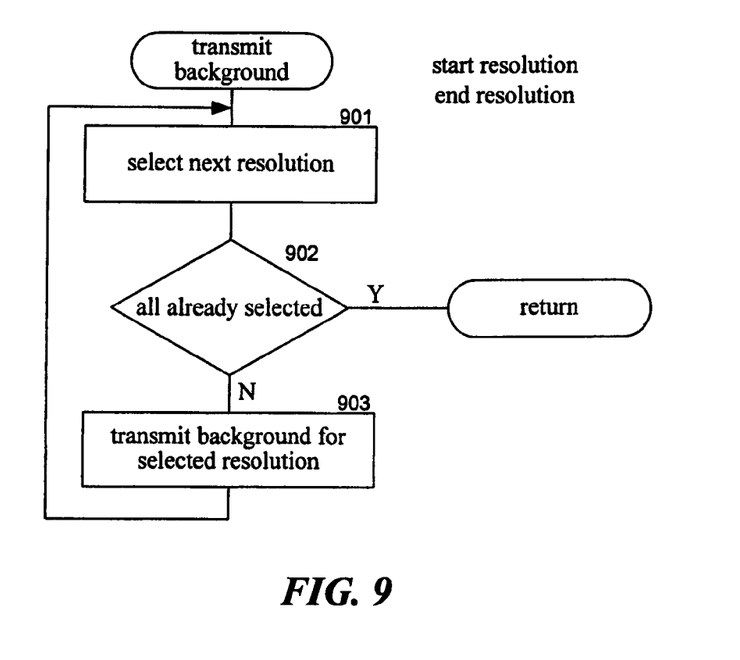
FIG. 9 is a flow diagram that illustrates the processing of the transmit background component in one embodiment.

FIG. 9 is a flow diagram that illustrates the processing of the transmit background component in one embodiment. The component is passed a start resolution and an end resolution. The component transmits the background in each of the resolutions in the range of the start resolution to the end resolution. In block 901, the component selects the next resolution starting with the start resolution. In decision block 902, if all the resolutions have already been selected, then the component returns, else the component continues at block 903. In block 903, the component transmits the background in the selected resolution and loops to block 901 to select the next resolution.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A computer-readable storage device containing instructions for controlling a computer system to display an image, by a method comprising:
   receiving, in the following order, a first region of the image in a first resolution, a second region of the image in the first resolution, the first region in an intermediate resolution, the first region in a second resolution, the second region in the intermediate resolution, and the second region in the second resolution, the first region of the image having been identified as a region of interest and the second region of the image being a region other than the first region, a region of interest being an area of the image that a viewer would likely perceive as more important than the other region of the image, the first resolution being a lower resolution than the second resolution, the intermediate resolution being a higher resolution than the first resolution and a lower resolution than the second resolution; and
   displaying the regions of the image in the resolutions in the order received so that a viewer views the first region before the second region and views the first region in the first resolution before the second resolution.

2. The computer-readable storage device of claim 1 wherein the first region is a foreground region and the second region is background.

3. The computer-readable storage device of claim 2 wherein the region of interest includes attention objects.

4. The computer-readable storage device of claim 3 wherein the region of interest comprises attention objects with high attention values.

5. A computing device for transmitting an image, comprising:
   a memory for storing
      the image;
      an identification of a first region and a second region of the image, the first region of the image being a region of interest and the second region of the image being a region other than the first region, a region of interest being an area of the image that a viewer would perceive as important;
      an identification of a first resolution and a second resolution, the first resolution being a lower resolution than the second resolution;
      an identification of an intermediate resolution that is a higher resolution than the first resolution and a lower resolution than the second resolution; and
      computer-executable instructions for transmitting, in the following order, the first region in the first resolution, the second region in the first resolution, the first region in the intermediate resolution, the first region in the second resolution, the second region in the intermediate resolution, and the second region in the second resolution for progressive display of the image; and
   a processor for executing the computer-executable instructions stored in the memory.

6. The computing device of claim 5 including computer-executable instructions for receiving, from a receiving computing device that is receiving the transmitted image, an indication to stop transmitting the image and in response to receiving the indication, stopping the transmitting of the image without completing the transmitting of the second region in the second resolution.

7. The computing device of claim 5 wherein the first region is a foreground region of the image and the second region is a background region of the image.

8. A computing device for transmitting an image, comprising:
   a memory for storing
      the image;
      an identification of a first region and a second region of the image, the first region of the image being a region of interest and the second region of the image being a region other than the first region, a region of interest being an area of the image that a viewer would perceive as important;
      an identification of a first resolution and a second resolution, the first resolution being a lower resolution than the second resolution;
      computer-executable instructions for transmitting the image by transmitting, in the following order, the first region in the first resolution, the second region in the first resolution, the first region in the second resolution, and the second region in the second resolution for progressive display of the image; and
      computer-executable instructions for receiving, from a receiving computing device that is receiving the transmitted image, an indication to stop transmitting the image and in response to receiving the indication, stopping the transmitting of the image without completing the transmitting of the image to the receiving computing device; and
   a processor for executing the computer-executable instructions stored in the memory.

9. A computer system for displaying an image, the method comprising:
   a memory storing computer-executable instructions for
      a component that identifies a region of interest of the image, a region of interest being an area of the image that a viewer would likely perceive as important to view before other regions of the image; and
      a component that displays the image by displaying, in the following order, the region of interest in a first resolution, a region other than the region of interest in the first resolution, the region of interest in a second resolution, and the region other than the region of interest in the second resolution, the first resolution being a lower resolution than the second resolution;
      wherein the component that displays displays, in the following order, the region of interest in the first resolution, the region of interest in an intermediate resolution, the region other than the region of interest in the first resolution, the region other than the region of interest in the intermediate resolution, the region of interest in the second resolution, and the region other than the region of interest in the second resolution, the intermediate resolution being a higher resolution than the first resolution and a lower resolution than the second resolution; and
   a processor for executing the computer-executable instructions that are stored in memory.

10. A computer system for displaying an image, the method comprising:
- a memory storing computer-executable instructions for
  - a component that identifies a region of interest of the image, a region of interest being an area of the image that a viewer would likely perceive as important to view before other regions of the image; and
  - a component that displays the image by displaying, in the following order, the region of interest in a first resolution, a region other than the region of interest in the first resolution, the region of interest in a second resolution, and the region other than the region of interest in the second resolution, the first resolution being a lower resolution than the second resolution wherein the component that displays displays, in the following order the region of interest in the first resolution, the region other than the region of interest in the first resolution, the region of interest in the intermediate resolution, the region of interest in the second resolution, the region other than the region of interest in the intermediate resolution, and the region other than the region of interest in the second resolution, the intermediate resolution being a higher resolution than the first resolution and a lower resolution than the second resolution; and
- a processor for executing the computer-executable instructions that are stored in memory.

11. A computer-readable storage device containing instructions for controlling a computer system to display an image, by a method comprising:
- receiving, in the following order, a first region of the image in a first resolution, the first region in an intermediate resolution, a second region of the image in the first resolution, the second region in the intermediate resolution, the first region in a second resolution, and the second region in the second resolution, the first region of the image having been identified as a region of interest and the second region of the image being a region other than the first region, a region of interest being an area of the image that a viewer would likely perceive as more important than the other region of the image, the first resolution being a lower resolution than the second resolution, the intermediate resolution being a higher resolution than the first resolution and a lower resolution than the second resolution; and
- displaying the regions of the image in the resolutions in the order received.

12. The computer-readable storage device of claim 11 wherein the first region is a foreground region and the second region is background.

13. The computer-readable storage device of claim 11 wherein the region of interest includes attention objects.

14. The computer-readable storage device of claim 11 wherein the region of interest comprises attention objects with high attention values.

15. A device for transmitting an image, comprising:
- a memory storing computer-executable instructions of;
  - a component that determines a most appropriate resolution for display of the image; and
  - a component that transmits, in the following order, a first region of the image in a first resolution that is lower than the most appropriate resolution, the first region of the image in a second resolution that is lower than the most appropriate resolution but higher than the first resolution, a second region of the image in the first resolution, the second region of the image in the second resolution, the first region in the most appropriate resolution, and the second region in the most appropriate resolution, the first region of the image having been identified as a region of interest and the second region of the image being a region other than the first region, a region of interest being an area of the image that a viewer would likely perceive as more important than the other region of the image; and
- a processor that executes the computer-executable instructions stored in the memory.

16. The device of claim 15 wherein the first region is a foreground region and the second region is background.

17. The device of claim 15 wherein the region of interest includes attention objects.

18. The device of claim 15 wherein the region of interest comprises attention objects with high attention values.

* * * * *